W. W. MACFARREN.
TRACTION TRUCK.
APPLICATION FILED MAR. 19, 1918.
1,317,518.
Patented Sept. 30, 1919.
3 SHEETS—SHEET 1.
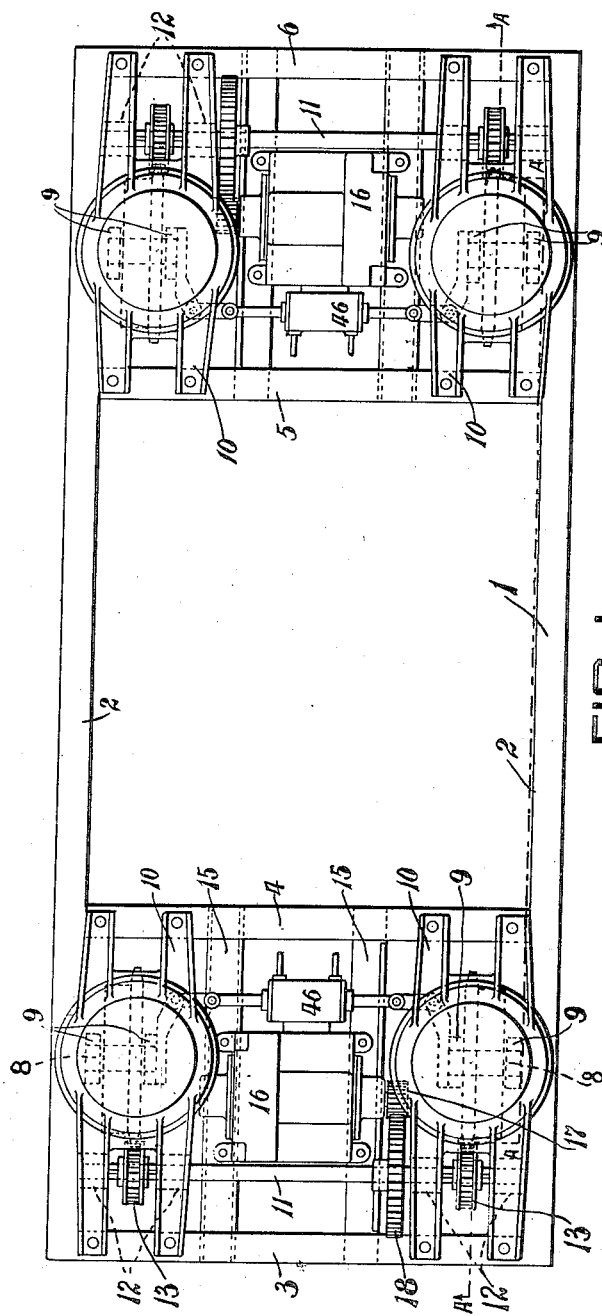
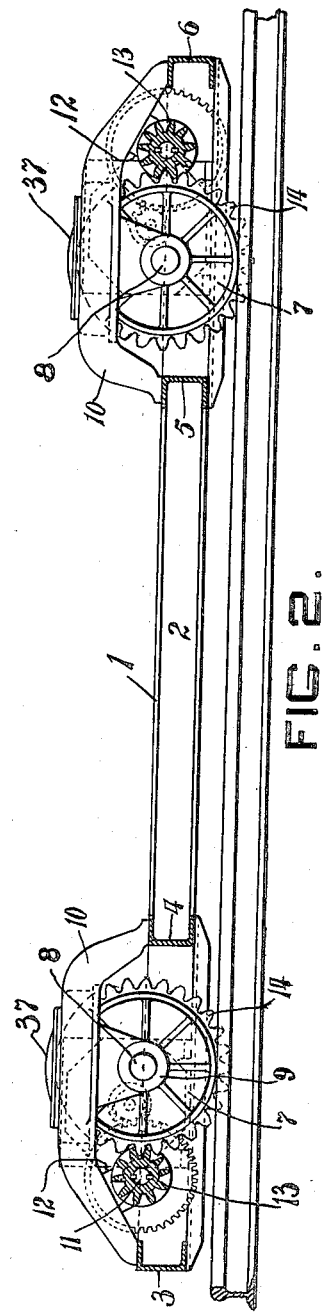
WITNESSES:
INVENTOR.
Walter W. Macfarren.

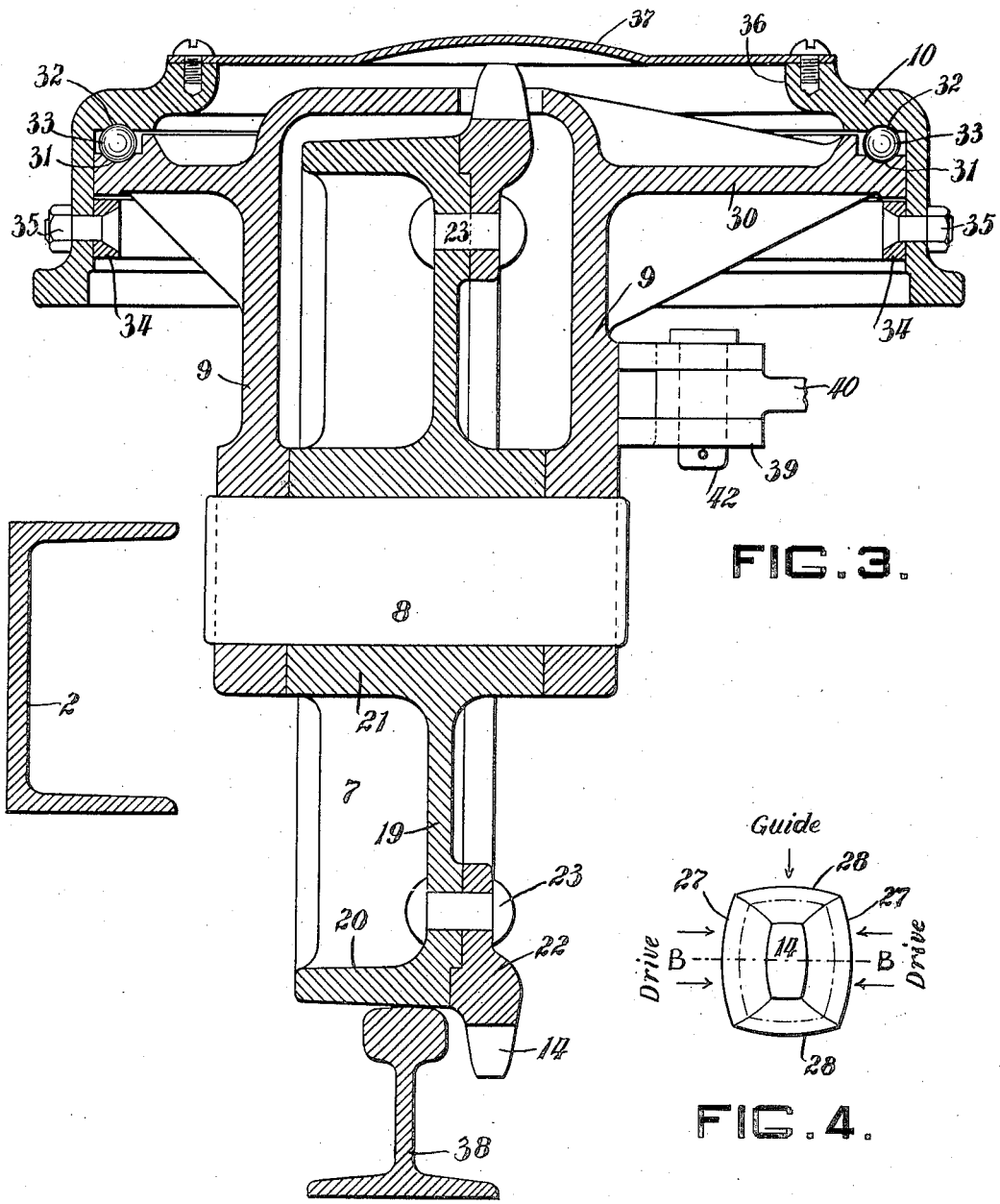

W. W. MACFARREN.
TRACTION TRUCK.
APPLICATION FILED MAR. 19, 1918.

1,317,518.

Patented Sept. 30, 1919.
3 SHEETS—SHEET 3.

WITNESSES:

INVENTOR.

Walter W. Macfarren

UNITED STATES PATENT OFFICE.

WALTER W. MACFARREN, OF PITTSBURGH, PENNSYLVANIA.

TRACTION-TRUCK.

1,317,518.   Specification of Letters Patent.   Patented Sept. 30, 1919.

Application filed March 19, 1918. Serial No. 223,323.

*To all whom it may concern:*

Be it known that I, WALTER W. MACFARREN, a citizen of the United States, residing at Pittsburgh, in the county of Allegheny, State of Pennsylvania, have invented certain new and useful Improvements in Traction-Trucks, of which the following is a specification.

My invention relates to traction trucks for use on a track and may be applied to street cars, mine locomotives, locomotive cranes, logging locomotives or any self propelled machine running on a track. With certain modifications my improved mechanism could be used for automobile farm trucks or tractors.

The objects of my invention are:

1st. To provide means for driving, and means for steering the track wheels, so that a long wheel base can be used on short curves;

2nd. To so arrange the motor and driving mechanism that the whole is economical of space;

3rd. To produce a freely steerable track wheel which will have great carrying capacity and extreme rigidity in all directions;

4th. To arrange four such wheels so that the truck has a very stable bearing on the track, and is thus adapted for overhanging loads, as in locomotive cranes;

5th. To combine a flange for the track wheel and a drive gear for the same in one member;

6th. To arrange a driving pinion so that it will be in working engagement with the drive gear on the track wheels while the latter are steered; and 7th. To combine these various elements into a convenient and practical form of traction truck adapted to a variety of purposes.

To these ends my invention comprises the various parts shown in the accompanying drawings, in which:

Figure 1 is a plan view of a truck;

Fig. 2 is a sectional side elevation of the same on the line A—A of Fig. 1;

Fig. 3 is an enlarged tranverse vertical section through the track wheel and its connected parts;

Fig. 4 is an enlarged end view of one of the teeth in the flange of the track wheel.

Figure 5:
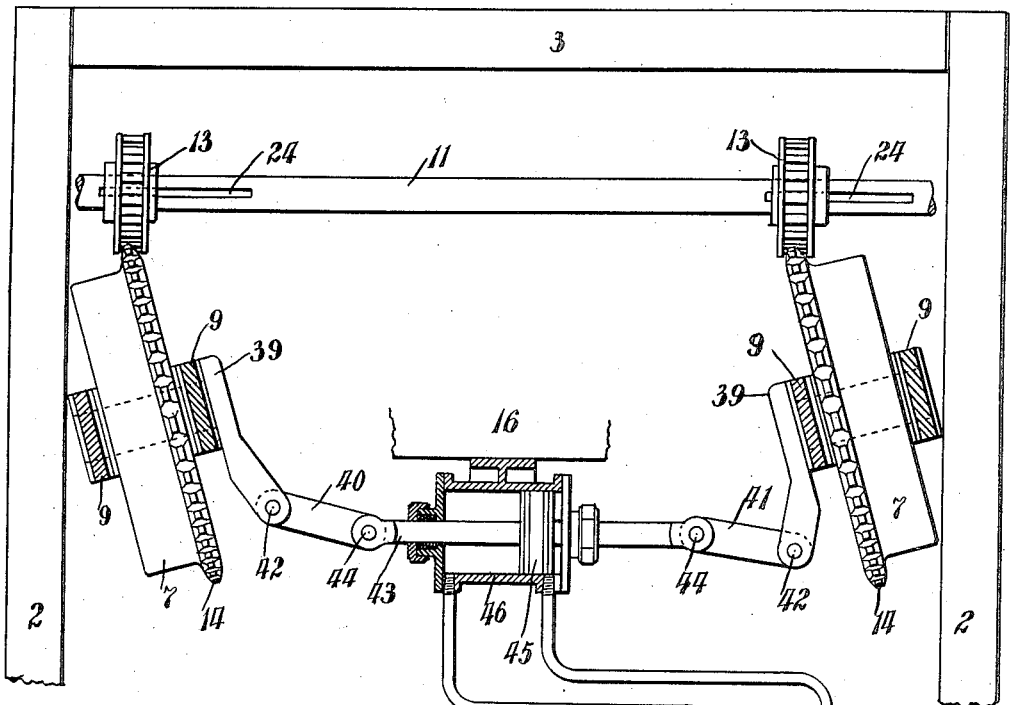
Fig. 5 is a diagrammatic plan view of a pair of my improved track wheels, and their driving and steering connections.

These drawings (with the exception of the air steering cylinders) are reproduced from working details from which a successful truck has been constructed.

Referring to the drawings the truck frame 1 may be constructed of a pair of side members 2, and the connected cross members 3, 4, 5 and 6; or all six of these members may be combined in one casting.

The cross members 3 and 4 form the framework for one pair of track wheels 7, and as the other pair are similarly mounted between the cross members 5 and 6 only one pair will be described in detail.

The track wheels 7 are mounted on short axles 8, each of these latter being connected to a swiveling trunnion 9, which engages a trunnion saddle 10 secured to the cross members 3 and 4.

A shaft 11 is mounted in bearings 12 secured to the trunnion saddles 10, and this shaft carries a pair of drive pinions 13, each of which engages with a toothed flange 14, on one of the track wheels 7.

Two motor supports 15 are bolted to cross members 3 and 4, and these supports carry a motor 16 provided with a pinion 17, which drives a gear 18 upon shaft 11.

For the sake of clearness the motor 16 is not shown in Fig. 2. The motor 16 is shown as an electric motor, but obviously a steam or air motor could be used, and in this case the shaft 11 might form the crank shaft thereof.

Figure 6:
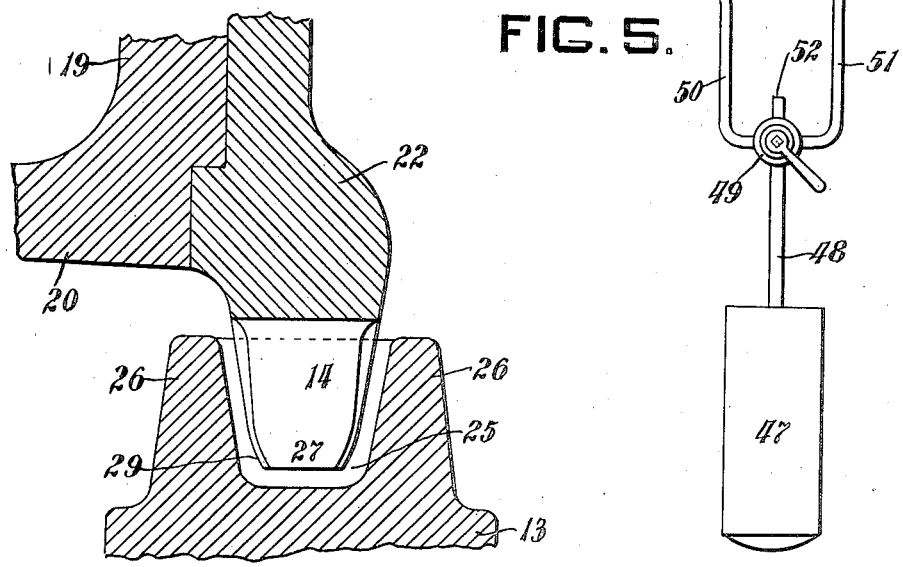
Fig. 6 is an enlarged horizontal cross section through the teeth of the track wheel and its driving pinion.

Referring to Figs. 3, 4 and 6 the track wheels 7 are composed of two parts: viz., a body portion 19 which includes the wheel tread 20 and the hub 21, and a detachable flange ring 22, which may be secured to the wheel body 19 by suitable rivets or bolts 23, or cast integral therewith.

The teeth 14 being spaced continuously around the wheel 7 form an effective flange to keep the wheel on the track, and these teeth having two separate functions, viz., driving and guiding the wheel, are of peculiar shape as shown in Figs. 3 and 6. Shaft 11 is provided with keys 24, and pinions 13 are loosely mounted thereon for free endwise movement.

Pinions 13 are each provided with teeth 25 of usual form, and a pair of inclosing shrouds 26, the same being spaced apart so as to allow ample side clearance for the teeth 14.

Referring to Fig. 4 the teeth 14 in the plane B—B of their rotation have the usual gear tooth contour, but instead of having surfaces which may be generated by the movement of a straight line, their driving surfaces 27 are curved, to better engage the straight teeth 25 of pinions 13. This is contrary to refined theory but it works in practice.

Further experience with this drive may indicate the advantage of curving the working faces of teeth 25 also.

The guiding faces 28 of teeth 14 are also curved, so that when the wheel 7 is swung to an angle with the rail, the teeth will not catch the rail head as they engage it, and for the same reason the ends of teeth 14 are tapered or thinned as shown at 29.

It will now be understood that due to the peculiar shape of teeth 14 they may serve as an effective flange for a track wheel, and further that they may be driven by pinion 13 when the wheels 7 are thrown to an angle, as shown in Fig. 5. In order to throw the wheels thus, a steering arrangement may be employed as shown in Fig. 5, and it will be understood that this mechanism acts directly upon the wheels 7 only, the pinions 13 sliding along the shaft 11 by reason of the contact between the teeth 14 and shrouds 26; the pinions 13 "floating" on the shaft 11 and being moved by the swing of wheels 7.

Referring to Fig. 3, the trunnions 9 are provided with a circular web 30, above which there is formed a ball groove 31. Similar ball grooves 32 are formed in the underside of the upper portions of saddles 10, and rows of balls 33 are placed in these grooves.

Since the frame 1 and its superposed weight is hung from the saddles 10, these weights are transferred directly through the balls 33 to trunnions 9, and wheels 7.

A retaining ring 34 is fitted to each saddle 10 below the web 30 on trunnion 9, and secured by bolts 35 to prevent other than rotative movement of the trunnions.

A circular opening 36 is formed in each saddle 10 of sufficient size to clear the ends of teeth 14, and a cover plate 37 may be placed above the same.

With threads 20 made 18" diameter, and teeth 14 made 21" outside diameter, the height of top of plate 37 above the top of rail 38 is only 20".

Referring to Fig. 5 a steering bracket 39 is bolted to each trunnion 9. Links 40 and 41 are connected to brackets 39 by pins 42, and also to a rod 43 by pins 44. Rod 43 is provided with a piston 45 working in a cylinder 46, which may be secured to motor 16 or supported in any convenient way. The parts 40, 41 and 43 form a linkage connecting the opposite wheels 7 to swing or steer them, and may obviously be replaced by a one-piece link if cylinder 46 is omited.

A reservoir 47 may be mounted on the truck in any convenient manner and charged with fluid pressure, compressed air being preferable unless the truck is steam driven. From reservoir 47 a supply pipe 48 leads to a four way valve 49, from which operating pipes 50 and 51 lead to opposite ends of cylinder 46, the exhaust escaping at 52. By these means a pair of wheels 7 may be swung either to right or left by operating the valve 49, the pinions 13 assuming corresponding co-acting positions on shaft 11, whether the same is at rest or in motion, and with or without the transmission of power from motor 16.

The truck illustrated herein was built with a wheel base of 8'—2" to run on a track of 42" gage, and would operate around curves of 16'—0" center radius. The angular swinging movement of wheels 7 was approximately 16 degrees to either side of the position shown in Fig. 1. As shown the truck is designed to be of minimum height above the rail but obviously where space is available this construction need not be followed. As shown all four wheels are steerable—obviously if conditions permitted two of the wheels might be arranged as shown, and the other two placed on a rigid axle in the common way. Conditions may also occur where only a two wheel truck is needed, as for a trailer.

As shown the track wheels and their connected driving and steering mechanism, are placed at the ends of the truck, leaving space between for a side dumping body, or for a turntable as used in locomotive cranes.

As shown each pair of wheels is driven by a separate motor, this being done for compactness and to avoid a longitudinal driving connection, but obviously both shafts 11 could be driven from a common motor.

As shown power operated steering devices are included, but obviously this may be done manually.

And further, experience has shown that my improved truck may be satisfactorily operated on a common track without any means for definitely steering the wheels 7, provided that opposite pairs of wheels are connected by a link as before mentioned and that a limit is imposed to their swing. In this case the teeth 14 acting as flanges have a sufficiently powerful contact with the rail head to swing the wheels 7 when entering or leaving a curve.

It is further obvious that if the wheels 7 were made of proper size to sustain the required weight they might be operated on the ground instead of a track. In this case the teeth 14 would preferably be formed at the center of the tread.

Regarding its original purpose applicant believes himself the first to produce a traction truck for operation on a track, in which the track wheels are steerable.

I therefore claim as my invention, all the patentable subject matter herein shown and covered by the following claims:

1. In a traction truck, a frame, a pair of traction wheels supporting a part of said frame and connected thereto so as to swing individually about vertical axes, a motor located between said wheels, and driving connections between said motor and the circumference of said wheels.

2. In a traction truck, a frame, four traction wheels supporting said frame and connected thereto so as to swing individually about vertical axes, means for driving each pair of wheels at their circumferences, and means for independently swinging each pair of wheels.

3. In a traction truck, a frame, a pair of traction wheels in supporting relation thereto, and connected thereto so as to swing individually about vertical axes, a gear on each of said wheels, a motor, and driving connections between said motor and said gears to drive a pair of wheels.

4. In a traction truck, a frame, a pair of traction wheels in supporting relation thereto, and connected thereto so that each of said wheels may swing individually about a vertical axis, gear teeth on the exterior of each of said wheels, a drive shaft, and a pair of pinions on said shaft, each of said pinions engaging the teeth on one of said wheels.

5. In a traction truck, a frame, a pair of traction wheels in supporting relation thereto, and connected thereto so that each of said wheels may swing individually about a vertical axis, gear teeth on the exterior of each of said wheels, a horizontal drive shaft, said shaft being located at approximately the level of the wheel centers, a pair of pinions on said drive shaft, each of said pinions engaging the teeth on one of said wheels, and said pinions being freely movable along the shaft, whereby constant driving engagement is maintained between said pinions and the teeth on said wheels, when the wheels are swung about their axes.

6. In a traction truck, a frame, a pair of traction wheels in supporting relation thereto, and connected thereto so that each of said wheels may swing individually about a vertical axis, a flange on each of said wheels, said flanges being larger than the treads of the wheels and having gear teeth formed thereon, a drive shaft, a pair of pinions on said shaft, each of said pinions engaging the teeth on one of the flanges, and being freely movable along the shaft, and a pair of shrouds on each of said pinions, said shrouds inclosing the flange teeth sidewise; whereby when the wheels swing about their axes the pinions are moved along the shaft by the contact between the teeth on the flanges and the shrouds on the pinions, the former moving the latter.

7. In a traction truck, a frame, a track wheel mounted in supporting relation thereto, and connected thereto so as to swing about a vertical axis, a flange on said wheel to guide it, and teeth on said flange to drive the wheel, the guiding faces of said teeth being rounded to easily engage the rail head when the wheel is swung.

8. In a traction truck, a frame, a traction wheel mounted in supporting relation to said frame and connected thereto so it may swing about a vertical axis, gear teeth on the exterior of said wheel, a drive pinion in engagement with said teeth, and said teeth having their driving faces rounded so as to have working contact with the teeth of the drive pinion when the wheel is swung about its axis.

In testimony whereof I hereunto affix my signature in the presence of two witnesses.

WALTER W. MACFARREN.

Witnesses:
A. M. GOODWIN,
J. G. KELLER.